(12) United States Patent
Morman

(10) Patent No.: US 6,368,533 B1
(45) Date of Patent: *Apr. 9, 2002

(54) PROCESS FOR FORMING FILMS, FIBERS AND BASE WEBS FROM THERMOSET POLYMERS

(75) Inventor: Michael T. Morman, Alpharetta, GA (US)

(73) Assignee: Kimberly-Clark Worldwide, Inc., Neenah, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,186

(22) Filed: Dec. 22, 1997

(51) Int. Cl.⁷ .................................. B29C 47/88
(52) U.S. Cl. .................... 264/211.18; 264/211.15; 264/103; 264/444; 264/473; 264/476; 264/477
(58) Field of Search .................. 264/211.14, 234, 264/237, 347, 433, 211.15, 211.18, 103, 444, 473, 476, 477

(56) References Cited

U.S. PATENT DOCUMENTS

| | | | |
|---|---|---|---|
| 3,933,759 A | 1/1976 | Hoeschele | 528/45 |
| 4,100,432 A | 7/1978 | Miyakawa et al. | 327/359 |
| 4,321,221 A * | 3/1982 | Broutman | 264/444 |
| 4,332,716 A | 6/1982 | Shah | 521/137 |
| 4,340,563 A | 7/1982 | Appel et al. | 264/518 |
| 4,474,934 A | 10/1984 | Tanaka et al. | 528/45 |
| 4,663,220 A | 5/1987 | Wisneski et al. | 428/221 |
| 4,767,577 A * | 8/1988 | Müller et al. | 264/3.3 |
| 4,767,825 A | 8/1988 | Pazos et al. | 525/408 |
| 4,916,005 A | 4/1990 | Lippert et al. | 428/192 |
| 4,952,659 A | 8/1990 | Hannah et al. | 528/45 |
| 5,055,241 A * | 10/1991 | Seigman et al. | 264/8 |
| 5,094,914 A | 3/1992 | Figuly et al. | 428/376 |
| 5,098,636 A | 3/1992 | Balk | 264/555 |

FOREIGN PATENT DOCUMENTS

| | | |
|---|---|---|
| DE | 2103769 | 9/1971 |
| EP | 0093393 A2 | 11/1983 |
| EP | 0122836 A1 | 10/1984 |
| EP | 0234168 A1 | 9/1987 |
| EP | 0219969 B1 | 1/1992 |
| EP | 0538923 A2 | 4/1993 |
| EP | 0564784 A1 | 11/1993 |
| EP | 0831119 A2 | 3/1998 |
| JP | 6109747 | 5/1986 |
| JP | 2047306 | 2/1990 |

OTHER PUBLICATIONS

Fred W. Billmeyer, Jr.; Textbook of Polymer Science (Second Edition) 1962; pp. 242–243.

PCT Search Report, Dated Dec. 5, 1999 for Application No. PCT/US98/27652 filed on Dec. 22, 1998.

* cited by examiner

Primary Examiner—Terrel Morris
Assistant Examiner—John J. Guarriello
(74) Attorney, Agent, or Firm—Dority & Manning, P.A.

(57) ABSTRACT

A process for forming fibers, films and fibrous webs from thermoset polymers is disclosed. The process includes first forming an energy activatable prepolymer composition. The prepolymer composition is extruded through a die in order to form polymeric articles. Once extruded through the die, the prepolymer composition is then contacted with an energy source which causes the prepolymer composition to irreversibly undergo a chemical transformation to form a thermoset polymer. The cured polymeric articles can then be collected onto a surface and used as desired. The energy source used to activate the prepolymer composition can be, for instance, a heated gas stream, ultra sonic sound waves, or a radiation source.

19 Claims, 4 Drawing Sheets

PROCESS FOR FORMING FILMS, FIBERS AND BASE WEBS FROM THERMOSET POLYMERS

FIELD OF THE INVENTION

The present invention is generally directed to forming various articles from thermoset polymers. More particularly, the present invention is directed to a process of first extruding a thermoset prepolymer composition into a desired shape and then crosslinking the composition to form the various polymeric articles, including films, fibers, filaments, fibrous webs, and the like.

BACKGROUND OF THE INVENTION

Polymeric articles, such as fibers and films, are useful for a wide variety of applications. For instance, thermoplastic polymeric fibers and films have been used in the past for making fluid absorbent wipers, towels, industrial garments, medical garments, medical drapes, and the like. Such articles are also used in recreational applications, such as for making tents and car covers. Films and nonwoven fabrics made from polymeric fibers have also achieved especially widespread use in the manufacture of personal care articles, such as diapers, feminine hygiene products and the like.

The nonwoven fabrics identified above particularly refer to webs made on the spunbond and meltblown processes. For instance, spunbond webs are typically produced by heating a thermoplastic polymeric resin to at least its softening temperature. The polymeric resin is then extruded through a spinnerette to form continuous fibers, which can then be subsequently fed through a fiber draw unit. From the fiber draw unit, the fibers are spread onto a foraminous surface where they are formed into a web and then bonded such as by chemical, thermal, or ultrasonic means.

Meltblown fabrics, on the other hand, have been conventionally made by extruding a thermoplastic polymeric material through a die to form fibers. As the molten polymer filaments exit the die, a high pressure fluid, such as heated air or steam, attenuates the molten polymer filaments to form fine fibers. Surrounding cool air is induced into the hot air stream which cools and solidifies the fibers. The fibers are then randomly deposited onto a foraminous surface to form a web. The web has integrity as made but may be additionally bonded.

In the past, nonwoven webs and films have been made almost exclusively with thermoplastic polymers, such as nylon, polyester, polypropylene and polyethylene. Such polymers, however, can degrade during the melt processing operations used to form the articles. For instance, during the formation of many polymeric articles, the polymers used to make the products are exposed to various harsh conditions which can adversely affect the properties of the polymers. For example, during extrusion, a polymer is not only subjected to various external forces, but is also heated to high temperatures. Due to these conditions, fibers and films made from these polymers can have decreased strength and elasticity, can become brittle, and can yellow or otherwise degrade in color, which can make a product with a short product life and decreased properties.

In the past, in order to correct or minimize the above-described problems, much research has been done to increase the melt stability of the polymers and improve the physical properties and the resiliency of products made from the thermoplastic polymers. Unfortunately, although some improvements have been made to the polymers, the cost of the polymers have increased.

Additionally, as the polymers are thermoplastics without permanent crosslinks, the products readily melt, dissolve, and/or burn. Products made from thermoplastic elastomers without permanent crosslinks also have reduced elastic properties.

In view of the above deficiencies and drawbacks, a need currently exists for a replacement to conventional thermoplastic polymers used to make films, fibers and nonwoven webs. In particular, it would be very desirable if, besides thermoplastic polymers, polymers that form permanent crosslinks were available for forming polymeric articles. Specifically, a need exists for a replacement polymer that has improved properties for some applications.

SUMMARY OF THE INVENTION

The present invention recognizes and addresses the foregoing disadvantages and others of prior art constructions and methods.

In general, the present invention is directed to forming polymeric articles from thermoset polymers as opposed to thermoplastic polymers. Of advantage, many thermoset polymers are less expensive than some conventionally used thermoplastic polymers. Further, thermoset polymers can be more flame-resistant, more chemical-resistant, and can have better elastic properties than many thermoplastic polymers.

As used herein, a thermoset polymer refers to resins which change irreversibly under the influence of heat from a fusible and soluble material into one which is infusible and insoluble through the formation of a covalently crosslinked, thermally stable network. In contrast, thermoplastic polymers soften and flow when heat and pressure are applied, the changes being reversible. Examples of thermosetting resins include ureas, phenolics, malamines, urethanes, and epoxys.

In the past, it was not believed possible to readily form thermoset polymers into fibers and films. In particular, it was believed that conventional thermoplastic polymer processing equipment could not be used to make thermoset polymer filaments and films. The present inventor, however, has discovered a method for accomplishing this task.

The above objects and advantages of the present invention are achieved by providing a method of forming polymeric articles from thermosetting polymers. The method includes the steps of providing a thermoset prepolymer composition, which is initially in a fluid state. The prepolymer composition is energy activatable meaning that when the prepolymer composition is treated by a particular energy source, the composition will undergo an irreversible chemical transformation to form a post reaction thermoset polymer.

In accordance with the method of the present invention, the prepolymer composition is extruded through at least one die to form a polymeric article. The polymeric article is then treated by an energy source after the prepolymer composition has exited the die. The energy source causes the prepolymer composition to gel and/or harden and form the post reaction thermoset polymer.

The polymeric articles that can be made according to the present invention include, for instance, films, fibers and nonwoven webs. In one embodiment, the polymeric articles can be deposited upon a foraminous surface as they are being formed and after or during contact with the energy source. As used herein, a foraminous surface refers to a surface upon which the polymeric article is placed after extrusion and can include, for instance, a traveling screen or conveyor.

Examples of thermoset polymers that can be used in the process of the present invention include polyurethanes, silicone polymers, phenolic polymers, amino polymers, epoxy polymers, and the like. In general, any thermoset polymer can be used in the process that can be made from an energy activatable prepolymer composition.

The energy source used to convert the prepolymer composition into the thermoset polymer can vary. For instance, in one embodiment, when the prepolymer composition is heat activatable, the energy source can comprise a heated gas. Other energy sources that may be used in the process of the present invention include ultra sonic sound waves, irradiation, infrared radiation, and microwave energy. In general, the energy source that is used to activate the prepolymer composition will generally depend upon the prepolymer composition used and the catalyst present within the composition if a catalyst is needed.

In one particular embodiment, the present invention is directed to a method of forming a nonwoven web from a thermoset polymer. The method includes the steps of extruding an energy activatable thermoset prepolymer composition through a die to form fibers. The fibers are contacted with an energy source, which causes the prepolymer composition to irreversibly polymerize and form a thermoset polymer. Thereafter, the fibers are formed into a nonwoven web such as, for instance, by being deposited upon a foraminous surface during formation of the fibers.

The chemical prepolymer composition may include a solvent or processing aid to lower the viscosity of the composition for ease of extrusion including higher throughputs and lower temperatures. The solvent could help retard the crosslinking reaction and could partially or totally evaporate during or after fiber and/or film formation.

In order to prevent the prepolymer composition from solidifying within the die, the die can be cooled during the process. For instance, fibers exiting the die can first contact a first gaseous zone prior to contacting the energy source. The first gaseous zone can comprise a stream of cool air which flows around the die and generally in the same direction as the prepolymer composition being fed through the die. This air is maintained at a temperature so the crosslinking reaction is very slow. The fluid composition, either in the form of a filament or film, can thus be attenuated into fine fibers or thin films.

After passing through the first gaseous zone, the fibers can then be treated by an energy source, such as a heated gas which can cause the prepolymer composition to crosslink and form a thermoset polymer. The heated gas can be contained in the surrounding atmosphere or can be contained in a gas stream flowing generally in the same direction as the first gas stream. After contacting the heated gas, the fibers can then be deposited upon a foraminous surface to form the nonwoven web.

In one further alternative embodiment of the present invention, a solid additive can be incorporated into the fibers or film during formation. Additionally, additives can be added that go into the fiber matrix or attach to the film. The solid additive can be pigments, dyes, opacifiers, pulp fibers, other natural or synthetic fibers, or superabsorbent particles. As used herein, a superabsorbent material refers to materials that absorb more than 20 grams of liquid per gram of solid. The solid additive can be combined with the polymeric article being formed during contact with the energy source. For instance, when the energy source is a heated gas stream, the additive can be present within the stream.

Other objects, features and aspects of the present invention will be discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
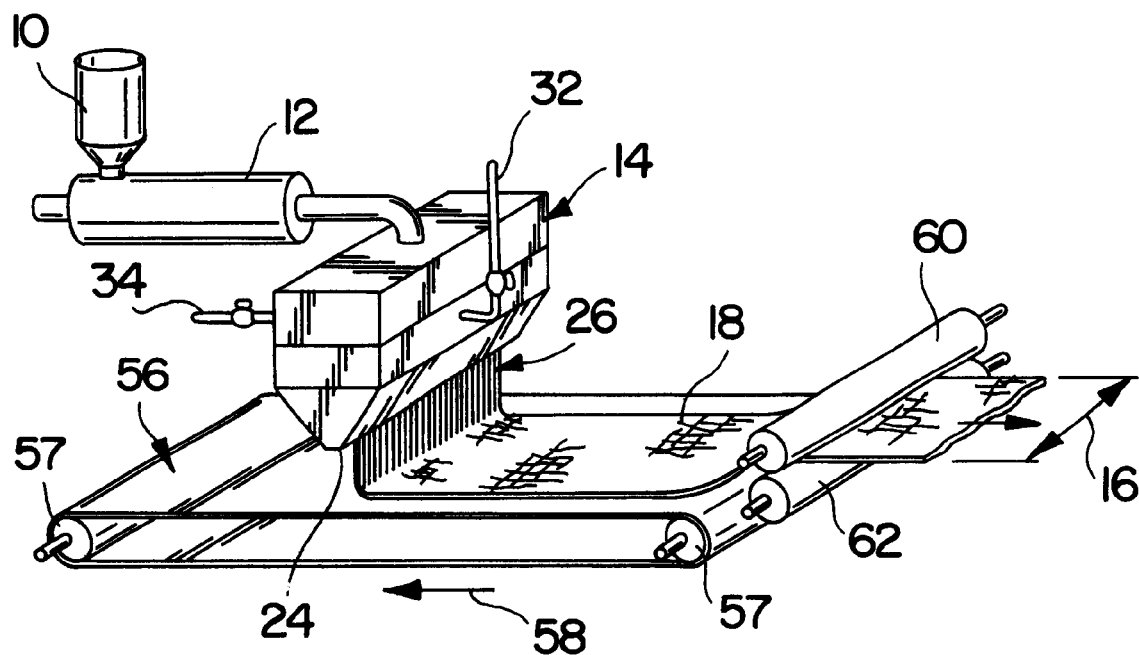
FIG. 1 is a perspective schematic view illustrating one embodiment of a process for forming a nonwoven web in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a process for forming polymeric articles, such as fibers, films and fibrous webs, from thermoset polymers. In the past, these types of articles have conventionally been made from thermoplastic polymers. As described above, in the past, it was believed that thermoset polymers were not capable of being used in melt processing type operations, such as extrusion processes, without substantial difficulties. The present invention, however, is directed to a new manner in which thermoset polymers can be processed in polymer melt processing equipment to form various articles.

For many applications, the use of articles made from thermoset polymers offers various advantages and benefits over articles made from conventional thermoplastic polymers. For instance, thermoset polymers tend to be much more flame and heat resistant than thermoplastic polymers, thus making them well suited for use in flame resistant garments and materials. Many thermoset polymers have great elastic properties due, in part, to the crosslinking that occurs when the polymer is formed. Thermoset polymers can also be strong yet very soft. Of particular advantage, most thermoset polymers are less expensive to produce than some conventional thermoplastic polymers.

Thermoset polymers also tend to be more chemical resistant than many thermoplastic polymers. In particular, most thermoset polymers that have been crosslinked are not soluble in organic solvents. In this regard, thermoset polymers are also well suited for use in filter products and chemical resistant garments and materials.

Polymeric articles made according to the present invention can be incorporated into a limitless number of different products and items. For instance, films and base webs made according to the present invention can be used to form garments, such as hospital, industrial, and safety garments, diapers, personal care articles, filters, car covers, tents, and the like. It is believed that some base webs made according to the present invention may have good absorbency and good wicking properties. Thus, the webs can also be used to construct liquid absorbent products, such as residential and industrial wipers.

Very broadly, the process of the present invention involves the steps of extruding a prepolymer composition through a die in order to form fibers and films. Upon exiting the die, the prepolymer composition is then treated by an energy source which causes the composition to undergo an irreversible chemical transformation to form a thermoset polymer. For instance, the energy source can cause crosslinking and polymerization within the composition. The thermoset polymer then gels and/or hardens to form the desired object.

As described above, thermosetting polymers are materials that, when reacted, cannot be remelted or remolded without destroying their original molecular characteristics. Thermosetting prepolymer resins are usually low viscosity liquids or low molecular weight solids that contain at least one crosslinking agent which induces curing. For thermoset polymers, curing involves a permanent chemical change resulting in infusible, insoluble products with excellent thermal and dimensional stability. Of particular advantage, the properties of many thermoset polymers can be varied as desirable by varying the molecular weight ranges, functional groups and the crosslinking agent concentration used to construct the polymer.

In the past, thermoset polymers were not used in conventional thermoplastic extruding equipment to form fibers and films due to the possibility that the polymer would crosslink and solidify within the equipment. Further, in the past, few mechanisms were available for controlling the rate at which the thermoset polymer formed while processing the thermoset prepolymer composition.

In order to alleviate the above concerns, the process of the present invention is directed to extruding a thermoset prepolymer composition, which is cured during and/or immediately after the polymeric articles are being formed. The thermoplastic polymer equipment used in the meltblowing process is especially useful in the process as the polymeric articles being formed are not in physical contact with any solid part of the equipment until after the article has been formed.

More particularly, the present invention is directed to using a prepolymer composition that is energy activatable, meaning that the prepolymer composition will not appreciably crosslink, cure or react to form the thermoset polymer without first being treated by some type of energy source. In this manner, the prepolymer composition can be safely extruded through the extrusion equipment and die without solidifying within the equipment.

The energy source needed in order to convert the prepolymer composition into a solidified thermoset polymer can vary and will depend upon the ingredients contained within the prepolymer composition, especially if a catalyst is present within the composition. For instance, the prepolymer composition may be activated and caused to polymerize when subjected to heat, ultra sonic sound waves, irradiation, such as gamma radiation, infrared rays, microwaves, and the like.

For example, in one embodiment, the prepolymer composition can be heat activatable, such that the composition will polymerize and/or crosslink when treated by a heat source, such as a stream of heated air or steam. In this embodiment, the prepolymer composition can exist in a fluid state at room temperature or when heated to a temperature below its crosslinking temperature. While in a fluid state, the prepolymer composition can be fed through a die and extruded into various shapes, such as fibers and films. Once extruded through the die, the formed polymeric articles can be subjected to a heated gas source hot enough to initiate crosslinking and cause the prepolymer composition to solidify and form a thermoset polymeric article.

Of particular importance, the prepolymer composition should not be heated by the heat source prior to exiting the die. In this manner, according to the present invention, if necessary the die can be cooled or maintained below a predetermined temperature. For instance, a cool air stream can be circulated through the die during the extrusion process. As used herein, a cool stream refers to a gas that is at a temperature insufficient for the prepolymer composition to appreciably polymerize and form a thermoset polymer. More particularly, in one embodiment, a cool stream refers to a gas stream that maintains the prepolymer composition below a temperature at which about 10% of the total potential crosslinking of the composition will occur in about 1 minute.

Although primarily dependent upon the viscosity, the prepolymer composition can be partially crosslinked when extruded through a die according to the process of the present invention. For most applications, the total potential amount of crosslinking that may occur in the prepolymer composition should be less than about 10% during extrusion. Once exposed to an energy source, crosslinking should occur fairly rapidly. For instance, for most extrusion processes, at least 50% of the crosslinking should occur in less than about 10 seconds when the prepolymer composition is or has been contacted with an energy source.

Examples of thermoset polymers that can be formed from energy activatable prepolymer compositions include polyurethanes such as urethane polyesters, silicone polymers, phenolic polymers, amino polymers, epoxy polymers, bismaleimides, polyimides, and furan polymers. From the above list, it is believed that polyurethanes and silicone polymers are perhaps the most well suited for use in the process of the present invention. Often, thermoset prepolymer compositions will contain at least one polymer precursor and a curing agent. The precursor(s) maybe heat activatable eliminating the need for a catalyst. The curing agent chosen will not only determine the type of energy source needed to form the thermoset polymer, but may also influence the resulting properties of the thermoset. Examples of curing agents include aliphatic amines, aromatic amines, acid anhydrides, besides other catalytic curing agents.

As described above, polyurethanes are particularly well suited for use in the process of the present invention. Polyurethanes have great elasticity and strength, have great abrasion resistance, are resistant to solvents and to oxygen aging, and possess excellent shock absorption properties due to their viscoelastic nature. In particular, polyurethanes can have an elongation of over 100%, and particularly over about 175%.

Polyurethanes can be made from a prepolymer composition containing an isocyanate, a polyol, and a curing agent, such as a diamine. The polyol present within the composition can be a polyether or a polyester. Polyesters result in a product generally with better flexibility, while polyethers produce polymers that may be more chemically resistant and hydrolytically stable. Examples of energy activatable polyurethane prepolymer compositions that may be used in the process of the present invention are disclosed in U.S. Pat. Nos. 3,933,759, 4,952,659, 4,332,716, and 4,474,934, which are all incorporated herein by reference in their entireties.

The process of the present invention is primarily directed to producing fibers and films from thermoset polymers. The fibers that are formed, in one embodiment, can be used to produce fibrous webs, such as nonwoven webs. Specifically, meltblown and spunbond webs can be fabricated. The meltblown equipment, however, may be better adapted for use with the prepolymer compositions of the present invention rather than the spunbond equipment. Specifically, it is believed that fiber breakage may occur during extrusion when using the prepolymer compositions. Fiber breakage may have a dramatically adverse impact on a spunbond process. In a meltblown process, however, fiber breakage can occur without having a substantial adverse impact upon the process, due to the fact that the polymer automatically restrings or rethreads itself during the meltblown process.

The meltblown die also presents a band of liquid precursor filaments which can be readily and uniformly treated by the energy source. Spunbond equipment attenuates filaments by applying a drawing force to the solidified end of the filament. Fiber breakage thus greatly affects the viability of the process. Meltblown equipment operated to make continuous filaments can form a web of spunbond like filaments which can then be thermally embossed to form bond points to give a spunbond like material.

For exemplary purposes, reference will now be made to the process illustrated in FIGS. 1–5, which illustrates meltblown equipment and process for forming nonwoven webs in accordance with the present invention. Meltblowing processes generally involve extruding a polymeric composition through a plurality of small diameter capillaries of a meltblowing die into a gas stream which is flowing generally in the same direction as the extruded threads so that the extruded threads are attenuated, i.e., drawn or extended, to reduce their diameter to fiber or microfiber size. The gas stream directs the fibers onto a foraminous surface, such as a screen belt or a screen drum, where the fibers form a cohesive fibrous nonwoven web.

Referring to FIG. 1, an apparatus for forming a nonwoven web in accordance with the present invention is schematically illustrated. As shown, a prepolymer composition is fed to an extruder 12 from a hopper 10. As described above, the prepolymer composition is an energy activatable prepolymer that can be converted into a thermoset polymer. The temperature of the prepolymer composition within extruder 12 can vary depending upon the ingredients contained within the composition and the particular application. The temperature, however, should be below that point at which the prepolymer will begin to appreciably react and form the thermoset polymer. Pressure is applied to the prepolymer composition by the action of a turning screw located within the extruder. In particular, the prepolymer composition is forwarded by the pressure applying action of the turning screw to a meltblowing die 14.

Meltblowing die 14 generally extends a distance which is about equal to the width 16 of the nonwoven web 18 which is to be formed by the process.

Figure 2:
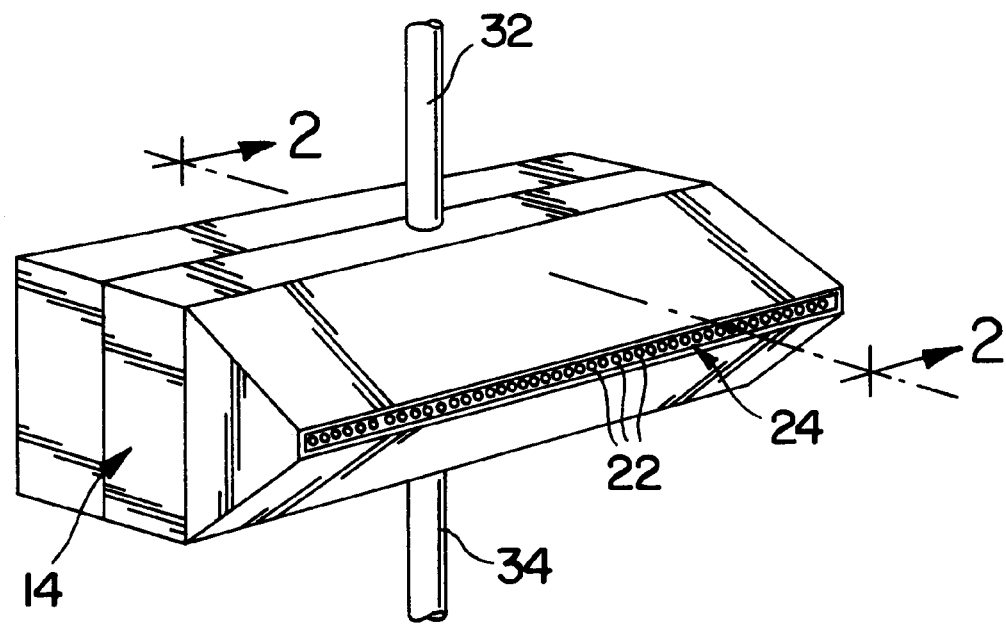
FIG. 2 is a perspective view of the die illustrated in FIG. 1.
Figure 3:
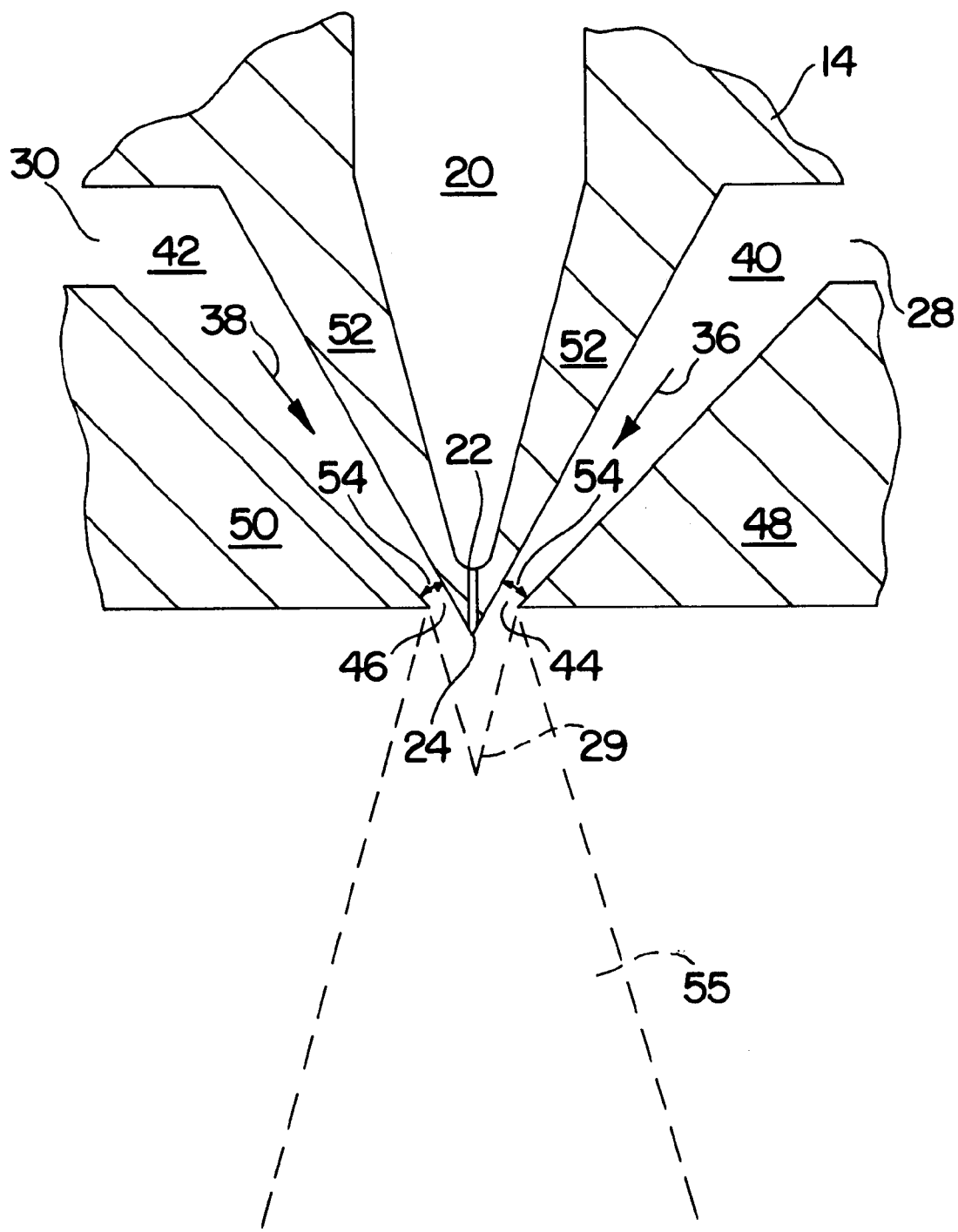
FIG. 3 is a schematic cross-sectional view of the die illustrated in FIG. 2 taken along line 2—2.
Figure 4:
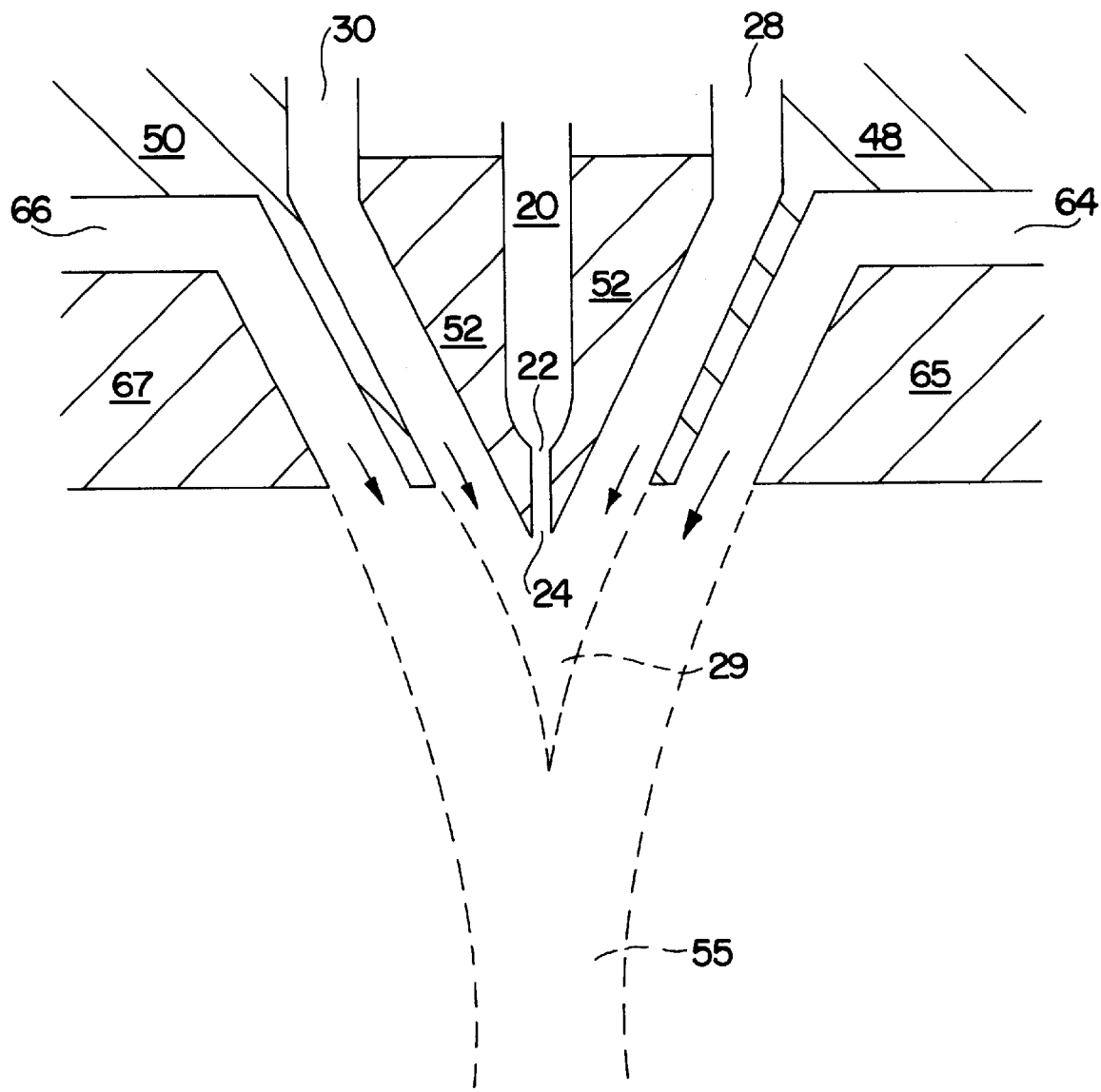
FIG. 4 is a schematic cross-sectional view of an alternative embodiment of a die that may be used in the process of the present invention.

Referring to FIGS. 3 and 4, the meltblowing die 14 includes an extrusion slot 20 which receives the prepolymer composition from the extruder 12. The prepolymer composition passes through extrusion slot 20 and through a plurality of small diameter capillaries 22, which exit the die 14 in a linear arrangement, best illustrated in FIG. 2, extending across the tip 24 of the die 14, to emerge from the capillaries 22 as liquid filaments 26.

Alternatively, besides containing a plurality of small capillaries 22 as illustrated in FIG. 2, meltblowing die 14 can contain a continuous slot where the capillaries are located. The continuous slot can be used, for instance, to extrude the prepolymer composition into a film. Alternatively, the slot can be used to form filaments, if the extruded prepolymer composition is contacted with high velocity air as the composition exits the slot.

As described above, during the process, it is important that the prepolymer composition not appreciably cross-link and solidify within extruder 12 or meltblowing die 14. In one embodiment, especially when the prepolymer composition is heat activatable, it may be desirable to cool the die 14. In this regard, die 14 includes gas inlets 28 and 30 which are for supplying a cool gas stream from gas sources 32 and 34 around die tip 24. The gas enters the die 14 at the inlets 28 and 30 and follows the path generally designated by the arrows 36 and 38 in FIG. 3 through two chambers 40 and 42 and on through to narrow passageways or gaps 44 and 46 so as to contact and attenuate the extruded liquid filaments 26 as they exit the capillaries 22 of the die 14. Chambers 40 and 42 are designed so that the cool gas exits the chambers and passes through the gas passages 44 and 46 to form a cool gaseous zone 29. The cooling gas also serves to attenuate the fibers as they are formed.

In the past, when meltblowing thermoplastic polymers, chambers 40 and 42 were adapted to receive a heated gas stream for attenuating the fibers. According to the present invention, however, when using thermoset polymers, a gas stream cool enough not to cause the prepolymer to appreciably react is supplied through the passages.

As shown in FIG. 3, die 14 includes a pair of air plates 48 and 50. The position of air plates 48 and 50 may be adjusted relative to a die-tip housing 52 to widen or narrow the width 54 of the gas passageways 44 and 46 so that the volume of gas passing through the passageways during a given time can be varied without varying the velocity of the gas. Furthermore, air plates 48 and 50 can be adjusted upwardly and downwardly in order to have a "recessed" die-tip configuration or a "protruding" die-tip configuration.

According to the present invention, after the formed fibers exit the first gaseous zone 29, the fibers are then treated by an energy source which causes the prepolymer composition to form the thermoset polymer. For instance in one embodiment, when the prepolymer composition is heat activatable, the fibers enter a second gaseous zone 55 where they are contacted with a heated gas, such as heated air or steam induced from the surroundings. If a radiation energy source is used, the treating can begin as the propolymer just exits the die and when the liquid filaments are still in the cool air zone. The treatment location and intensity must be controlled to ensure that the desired filament or film attenuation is achieved.

Within the second gaseous zone, the prepolymer composition at least partially undergoes an irreversible transformation to form the thermoset polymer. It should be understood, however, that besides using a heated gaseous stream, within zone 55 the fibers can also be contacted with other energy sources, such as irradiation or ultra sonic sound waves.

Referring back to FIG. 1, once contacted with an energy source, the fibers 26 are deposited onto a collecting arrangement which, in the embodiment illustrated, is a foraminous endless belt 56 driven by rollers 57. In the embodiment illustrated, fibers 26 are substantially continuous. It should be understood, however, that the fibers can also be formed in a substantially discontinuous fashion by varying the velocity of the gases contacting the fibers, the make-up of the prepolymer composition and the temperature of the different gaseous zones. The foraminous belt 56 may include one or more vacuum boxes located below the surface in order to assist in retaining the fibers on the belt. Ultimately, the fibers 26 are collected as a fibrous nonwoven web 18 on the foraminous surface 56 which is rotating as indicated by the arrow 58.

As shown, in one embodiment, the formed web 18 can be removed from the foraminous surface 56 by a pair of pinch rollers 60 and 62 which may be designed to press the entangled fibers of the web together to improve the integrity of the web. If the crosslinking reaction has not proceeded too far, the filaments can be permanently deformed by the pressure. If one of the rolls 60 or 62 has an embossing pattern, only the filaments below the pattern will be deformed. High pressure will cause the filaments to merge into a spot which becomes a bond site when the reaction is completed. Thereafter, the web may be transported for storage, may be fed into a separate process, such as an embossing operation if the crosslinking reaction has not gone too far, or maybe otherwise used as desired.

For instance, in one embodiment, the web formed on foraminous surface 56 can be embossed with an embossing pattern in order to further bond the fibers, to further crosslink the polymer, and/or to improve the appearance of the web. For example, the embossing operation can occur after the prepolymer composition has crosslinked at least 10% of its potential, and particularly from about 25% to about 90% of its potential.

Blends of different fibers such as thermoset and thermoplastic or thermoset composition A with a different thermoset composition B can also be used to form webs according to the present invention. Different mixes of polymers may enable good bonding to form a spunbond type of nonwoven. In the first case, the thermoplastic would melt forming a good bond point melted around the crosslinked thermoset fibers. In the second, composition B could react slower than composition A, so embossing would force B to form a bond point around filament A.

Of particular advantage, during formation of the thermoset fibers, the properties of the resulting polymer can be controlled and adjusted. For instance, for many thermoset polymers, the properties of the polymer can be varied by controlling the reaction rate. According to the process of the present invention, the reaction rate can be controlled by varying the gas temperatures, the gas pressures, and the gas velocities.

Referring to FIG. 4, an alternative embodiment of a meltblowing die configuration is illustrated. As shown, in this embodiment, besides including gas inlets 28 and 30, the die also includes gas inlets 64 and 66. Gas inlets 64 and 66 are designed to receive a heated gas and form a heated gas zone 55 which contacts the fibers being formed and causes the prepolymer composition to polymerize.

In this embodiment, the die also includes adjustable air plates 65 and 67 which can be used to vary the size of gas inlets 64 and 66 respectively. Similar to air plates 48 and 50, air plates 65 and 67 can be used to adjust the velocity of the gas flowing through the die.

Of particular advantage, the hot gas jets traveling through gas inlets 64 and 66 may tend to lower the viscosity of the liquid filaments to better draw and orient the fibers before the reaction has proceeded too far toward completion. Ultimately, the hot air jets may not only cause the thermoset polymer to form, but may also increase the fiber strength.

In some situations, it may be desirable to incorporate solid additives into the extruded fibers 26 and into the nonwoven web 18. For example, it may be desirable to incorporate one or more fibers, such as cotton fibers, wood pulp fibers, polyester fibers or other types of fibers or particulates into the thermoset fiber matrix. Other additives that may be incorporated with the thermoset fibers include superabsorbent materials and various fillers.

Figure 5:
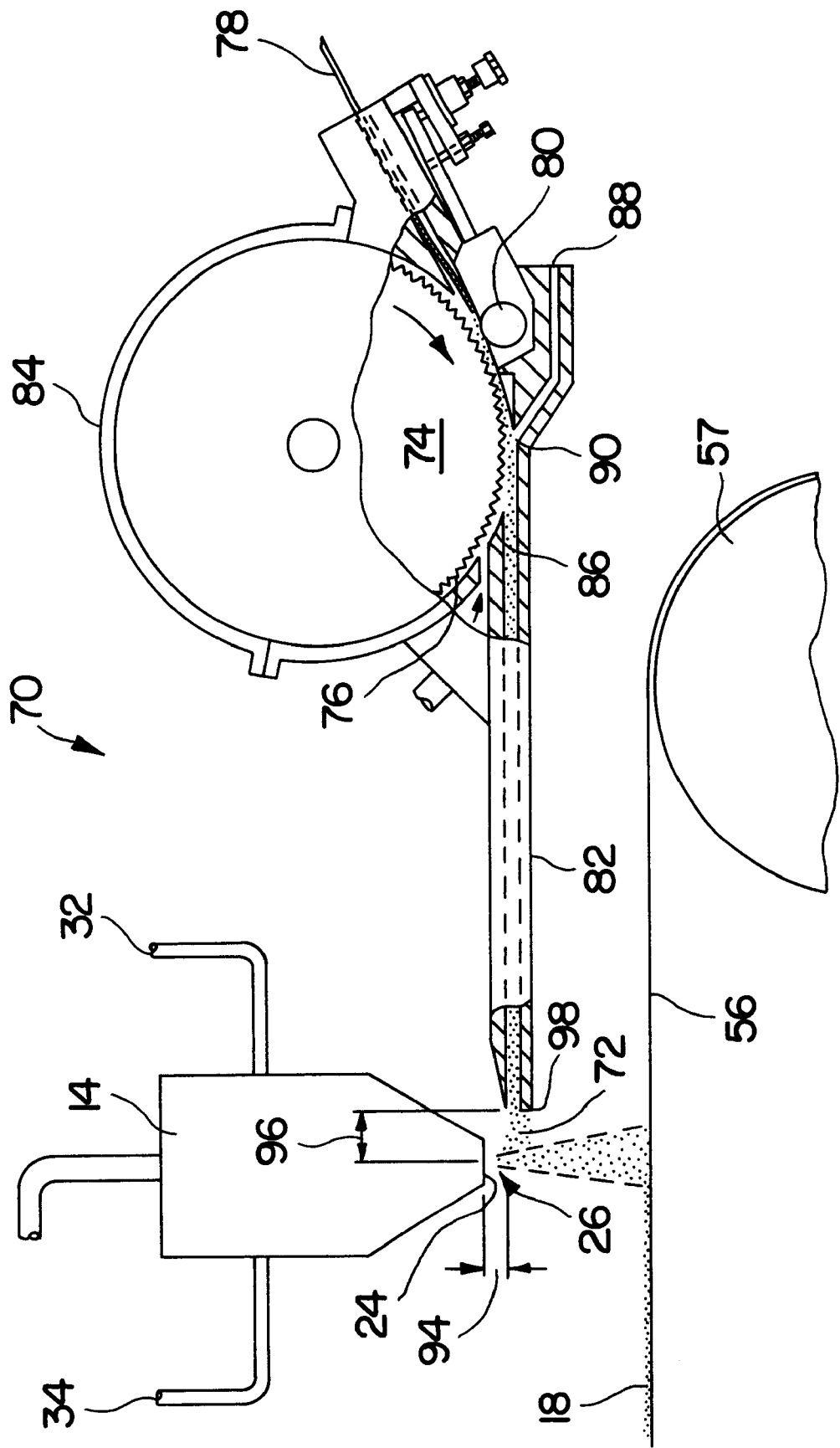
FIG. 5 is a schematic cross-sectional view with cut-away portions of one embodiment of an arrangement for incorporating solid additives into polymeric articles made according to the present invention.

Referring to FIG. 5, one embodiment of a method for incorporating solid additives into the fibers of the present invention is illustrated at 70. The process illustrated in FIG. 5 is commonly referred to as a coforming process as is disclosed in U.S. Pat. Nos. 4,100,432 and 4,663,220 which are both incorporated herein by reference in their entireties.

As shown in the embodiment illustrated in FIG. 5, after formation of fibers 26, a stream of a solid additive 72 is generally uniformly injected in to the stream of fibers. Distribution of the solid additive 72 into the fibers 26 can be accomplished by merging a gas stream containing the solid additive with the fiber stream. In accordance with the present invention, the carrier gas and the solid additive can be heated and, besides combining the solid additive with the fibers, can be used to polymerize or cure the prepolymer composition.

The apparatus for accomplishing this merger includes a conventional picker roll 74 which has a plurality of teeth 76 that are adapted to separate a mat, a bat or a sheet of a feed stock 78 into individual particles 72. The feed stock 78 is fed to the picker roll 74 by a roller arrangement 80. After the teeth 76 of the picker roll 74 have separated the feed stock into discrete particles 72, the particles are conveyed toward the meltblown fibers 26 through a forming duct or nozzle 82.

A housing 84 encloses the picker roll 74 and provides a passageway or gap 86 between the housing 84 and the surface of the picker roll 74. A gas, such as air, is supplied to the passageway or gap 86 between the surface of the picker roll 74 and the housing 84 by way of a gas duct 88. The gas duct 88 can enter the passageway or gap 86 at the junction 90 of the forming duct or nozzle 82 and the passageway 86. The gas is supplied in sufficient quantity to serve as a median for conveying the solid additive 72 from the teeth 76 of the picker roll 74 and through the forming duct or nozzle 82 at a velocity approaching that of the teeth 76 of the picker roll 74.

The height 94 of the forming duct or nozzle 82 with respect to the die tip 24 may be adjusted to vary the properties of the coformed product. Variation of the distance 96 of the tip 98 of the nozzle 82 from the die tip 24 will also achieve variations of the final coformed product. The height 94 and distance 96 will also vary depending upon the material being added to the fibers.

As shown in FIG. 5, the gas stream carrying the solid additive 72 can be moving in a direction which is generally perpendicular to the direction of the movement of the fibers 26. Other angles of merger of the two streams, however, may be utilized depending upon the particular application.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A method of forming polymeric fibers from thermosetting polymers, said method comprising the sequential steps of:

providing a thermoset prepolymer composition, said prepolymer composition being in a fluid state, said prepolymer composition being energy activatable such that when said prepolymer composition is contacted with an energy source said prepolymer composition undergoes an irreversible chemical transformation to form a post reaction thermoset polymer;

extruding said prepolymer composition through at least one meltblowing die and into a gas stream to form polymeric fibers, said meltblowing die being in communication with a cool gas stream that maintains the prepolymer composition below a temperature at which said prepolymer composition will undergo about 10% of its total cross-linking potential in 1 minute;

contacting said polymeric fibers with an energy source only after said prepolymer composition has exited said meltblowing die, said energy source causing said prepolymer composition to form said post reaction thermoset polymer; and thereafter depositing said fibers on to a foraminous surface.

2. A method as defined in claim 1, wherein said post reaction polymer comprises a polyurethane.

3. A method as defined in claim 1, wherein said post reaction polymer comprises a silicone polymer.

4. A method as defined in claim 1, wherein said energy source comprises a heated gas.

5. A method as defined in claim 1, wherein said energy source comprises ultra sonic sound waves, gamma radiation, infrared radiation, or mixtures thereof.

6. A method as defined in claim 4, wherein said polymeric article exiting said die first contacts a cool gaseous zone prior to being contacted with said heated gas.

7. A method of forming a nonwoven web from a thermoset polymer comprising the steps of:

extruding an energy activatable thermoset prepolymer composition through a meltblowing die and into a gas stream to form fibers, said meltblowing die being in communication with a cool gas stream that maintains the prepolymer composition below a temperature at which said prepolymer composition will undergo about 10% of its total cross-linking potential in 1 minute;

depositing said fibers onto a foraminous surface;

contacting said prepolymer composition only after said fibers exit said die and before said fibers are deposited on said foraminous surface with an energy source, said energy source causing said prepolymer composition to irreversibly cross-link to form a thermoset polymer; and forming said fibers into a nonwoven web on said foraminous surface.

8. A method as defined in claim 7, wherein said energy source comprises a heated gas.

9. A method as defined in claim 8, wherein said heated gas contains a solid additive that is incorporated into said nonwoven web.

10. A method as defined in claim 7, wherein said fibers exiting said die are first passed through a first gaseous zone prior to contacting said heated gas, said first gaseous zone being at a temperature insufficient for said prepolymer composition to substantially convert into said thermoset polymer.

11. A method as defined in claim 7 wherein said first gaseous zone is created by a stream of gas surrounding said die, said stream of gas flowing in the same direction as said prepolymer composition.

12. A method as defined in claim 11, wherein said heated gas is contained in a second gas stream, said second gas stream flowing in the same direction as said first gas stream.

13. A method as defined in claim 7, wherein said thermoset polymer comprises a silicone polymer or a polyurethane.

14. A method of forming a polymeric article from a thermoset polymer comprising the steps of:

extruding an energy activatable thermoset prepolymer composition through a meltblowing die and into a gas stream to form a polymeric article, said polymeric article comprising fibers, said meltblowing die being in communication with a cool gas stream that maintains the prepolymer composition below a temperature at which said prepolymer composition will undergo about 10% of its total cross-linking potential in 1 minute, said thermoset prepolymer composition being configured to cross-link and form a thermoset polymer when contacted with an energy source; and exposing said prepolymer composition formed into said polymeric article to an energy source in an amount that causes more than 10% of the cross-linking potential of said prepolymer composition to occur in less than about 10 seconds only after said polymeric article exits said die and prior to said polymeric article contacting a surface opposite said die.

15. A method as defined in claim 14, wherein said polymeric article comprises a plurality of fibers, and wherein said method further comprises the step of depositing said fibers onto a foraminous surface in order to form a nonwoven web.

16. A method as defined in claim 15, wherein said prepolymer composition used to form said fibers has crosslinked less than about 90% of its crosslinking potential when said fibers are formed into said nonwoven web, and wherein said method further comprises the step of embossing said web.

17. A method as defined in claim 16, wherein said prepolymer composition contained within said nonwoven web is crosslinked about 75% of its crosslinking potential prior to said embossing step.

18. A method as defined in claim 16, wherein said prepolymer composition contained within said nonwoven web is crosslinked about 50% of its crosslinking potential prior to said embossing step.

19. A process as defined in claim 14, wherein said thermoset polymer comprises a material selected from the group consisting of a polyurethane, a silicone polymer, a phenolic polymer, an amino polymer, and an epoxy.

* * * * *